United States Patent
Berkman et al.

(10) Patent No.: US 7,248,158 B2
(45) Date of Patent: *Jul. 24, 2007

(54) AUTOMATED METER READING POWER LINE COMMUNICATION SYSTEM AND METHOD

(75) Inventors: William H. Berkman, New York, NY (US); Paul A. Kline, Gaithersburg, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/327,341

(22) Filed: Jan. 9, 2006

(65) Prior Publication Data

US 2006/0145834 A1   Jul. 6, 2006

Related U.S. Application Data

(63) Continuation-in-part of application No. 11/134,377, filed on May 23, 2005, and a continuation-in-part of application No. 10/075,332, filed on Feb. 14, 2002, which is a continuation of application No. 09/835,532, filed on Apr. 16, 2000, now Pat. No. 6,958,680.

(60) Provisional application No. 60/268,519, filed on Feb. 14, 2001, provisional application No. 60/268,578, filed on Feb. 14, 2001, provisional application No. 60/197,615, filed on Apr. 14, 2000.

(51) Int. Cl.
  *G08B 1/08* (2006.01)
(52) U.S. Cl. ............ 340/538; 340/538.15; 340/310.01; 340/310.06; 340/870.02; 340/870.11; 324/126; 375/259

(58) Field of Classification Search ................ 340/538, 340/540, 541, 870.01, 870.11, 870.02, 539.1, 340/538.15, 538.16, 310.01, 310.06, 310.11, 340/310.17; 324/110, 126; 375/259, 257, 375/258; 370/475, 485
See application file for complete search history.

(56) References Cited

U.S. PATENT DOCUMENTS 3,445,814 A   5/1969   Spalti (Continued)

FOREIGN PATENT DOCUMENTS

DE   197 28 270 A1   1/1999

(Continued)

OTHER PUBLICATIONS

"Archnet: Automatic Meter Reading System Power Line Carrier Communication", www.archnetco.com/english/product/product_sl.htm, (2001).

(Continued)

*Primary Examiner*—Davetta W. Goins
(74) *Attorney, Agent, or Firm*—Mel Barnes; Capital Legal Group, LLC

(57) ABSTRACT

An automated meter reading power line communications system is provided, which may include measuring the utility usage of a first customer premises to provide first utility usage data, storing the first utility usage data in memory of a first device, wirelessly transmitting the first utility usage data from the first device, receiving the wirelessly transmitted first utility usage data at a second device coupled to a medium voltage power line, and transmitting the first utility usage data over the medium voltage power line.

35 Claims, 5 Drawing Sheets

U.S. PATENT DOCUMENTS

| | | |
|---|---|---|
| 3,641,536 A | 2/1972 | Prosprich |
| 3,656,112 A | 4/1972 | Paull |
| 3,701,057 A | 10/1972 | Hoer |
| 3,702,460 A | 11/1972 | Blose |
| 3,810,096 A | 5/1974 | Kabat et al. |
| 3,900,842 A | 8/1975 | Calabro et al. |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 3,973,087 A | 8/1976 | Fong |
| 3,973,240 A | 8/1976 | Fong |
| 3,980,954 A | 9/1976 | Whyte |
| 4,012,733 A | 3/1977 | Whyte |
| 4,057,793 A | 11/1977 | Johnson et al. |
| 4,060,735 A | 11/1977 | Pascucci et al. |
| 4,119,948 A | 10/1978 | Ward |
| 4,199,761 A | 4/1980 | Whyte et al. |
| 4,268,818 A | 5/1981 | Davis et al. |
| 4,433,284 A | 2/1984 | Perkins |
| 4,442,492 A | 4/1984 | Karlsson et al. |
| 4,473,816 A | 9/1984 | Perkins |
| 4,473,817 A | 9/1984 | Perkins |
| 4,569,045 A | 2/1986 | Schieble et al. |
| 4,642,607 A | 2/1987 | Strom et al. |
| 4,644,321 A | 2/1987 | Kennon |
| 4,652,855 A | 3/1987 | Weikel |
| 4,675,648 A | 6/1987 | Roth et al. |
| 4,686,382 A | 8/1987 | Shuey |
| 4,701,945 A | 10/1987 | Pedigo |
| 4,724,381 A | 2/1988 | Crimmins |
| 4,749,992 A | 6/1988 | Fitzmeyer et al. |
| 4,829,298 A | 5/1989 | Fernandes |
| 5,006,846 A | 4/1991 | Granville et al. |
| 5,056,107 A | 10/1991 | Johnson et al. |
| 5,272,462 A | 12/1993 | Teyssandier et al. |
| 5,341,265 A | 8/1994 | Westrom et al. |
| 5,369,356 A | 11/1994 | Kinney et al. |
| 5,426,360 A | 6/1995 | Maraio et al. |
| 5,448,229 A | 9/1995 | Lee, Jr. |
| 5,481,249 A | 1/1996 | Sato |
| 5,498,956 A | 3/1996 | Kinney et al. |
| 5,592,482 A | 1/1997 | Abraham |
| 5,748,104 A * | 5/1998 | Argyroudis et al. ... 340/870.11 |
| 5,777,545 A | 7/1998 | Patel |
| 5,801,643 A | 9/1998 | Williams et al. |
| 5,805,458 A | 9/1998 | McNamara et al. |
| 5,835,005 A | 11/1998 | Furukawa et al. |
| 5,856,776 A | 1/1999 | Armstrong et al. |
| 5,880,677 A | 3/1999 | Lestician |
| 5,892,430 A | 4/1999 | Wiesman et al. |
| 5,892,758 A | 4/1999 | Argyroudis |
| 5,994,998 A | 11/1999 | Fisher et al. |
| 6,072,858 A | 6/2000 | Bellin |
| 6,130,896 A | 10/2000 | Lueker et al. |
| 6,140,911 A | 10/2000 | Fisher et al. |
| 6,150,955 A * | 11/2000 | Tracy et al. ........... 340/870.02 |
| 6,151,330 A | 11/2000 | Liberman |
| 6,157,292 A | 12/2000 | Piercy et al. |
| 6,175,860 B1 | 1/2001 | Gaucher |
| 6,239,722 B1 | 5/2001 | Colton et al. |
| 6,243,413 B1 | 6/2001 | Beukema |
| 6,243,571 B1 | 6/2001 | Bullock et al. |
| 6,255,805 B1 | 7/2001 | Papalia et al. |
| 6,262,672 B1 * | 7/2001 | Brooksby et al. ........ 340/870.1 |
| 6,300,881 B1 | 10/2001 | Yee et al. |
| 6,304,231 B1 | 10/2001 | Reed et al. |
| 6,313,623 B1 | 11/2001 | Kojovic et al. |
| 6,346,875 B1 | 2/2002 | Puckette et al. |
| 6,373,399 B1 | 4/2002 | Johnson et al. |
| 6,441,723 B1 | 8/2002 | Mansfield, Jr. et al. |
| 6,459,998 B1 | 10/2002 | Hoffman |
| 6,480,510 B1 | 11/2002 | Binder |
| 6,504,357 B1 | 1/2003 | Hemminger et al. |
| 6,538,577 B1 * | 3/2003 | Ehrke et al. ........... 340/870.02 |
| 6,611,134 B2 | 8/2003 | Chung |
| 6,624,532 B1 | 9/2003 | Davidow |
| 6,650,249 B2 | 11/2003 | Meyer et al. |
| 6,684,245 B1 | 1/2004 | Shuey et al. |
| 6,687,574 B2 | 2/2004 | Pietrowicz et al. |
| 6,710,721 B1 | 3/2004 | Holowick |
| 6,737,984 B1 * | 5/2004 | Welles et al. .......... 340/870.02 |
| 6,778,099 B1 | 8/2004 | Meyer et al. |
| 6,778,817 B1 | 8/2004 | Bullock et al. |
| 6,842,459 B1 | 1/2005 | Binder |
| 6,885,674 B2 | 4/2005 | Hunt et al. |
| 6,933,835 B2 | 8/2005 | Kline |
| 6,950,567 B2 | 9/2005 | Kline |
| 6,954,814 B1 | 10/2005 | Leach |
| 6,958,680 B2 | 10/2005 | Kline |
| 6,965,302 B2 | 11/2005 | Mollenkopf et al. |
| 6,965,303 B2 | 11/2005 | Mollenkopf |
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,042,351 B2 | 5/2006 | Kline |
| 7,046,882 B2 | 5/2006 | Kline |
| 7,061,370 B2 | 6/2006 | Cern |
| 7,075,414 B2 | 7/2006 | Giannini et al. |
| 7,113,134 B1 | 9/2006 | Berkman |
| 7,142,094 B1 | 11/2006 | Davidow et al. |
| 2001/0010032 A1 | 7/2001 | Ehlers et al. |
| 2001/0038343 A1 | 11/2001 | Meyer et al. |
| 2001/0054953 A1 | 12/2001 | Kline |
| 2002/0002040 A1 | 1/2002 | Kline et al. |
| 2002/0053912 A1 | 5/2002 | Saha et al. |
| 2002/0064010 A1 | 5/2002 | Nelson et al. |
| 2002/0067171 A1 | 6/2002 | Lanan |
| 2002/0084914 A1 | 7/2002 | Jackson et al. |
| 2002/0097953 A1 | 7/2002 | Kline |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0130768 A1 | 9/2002 | Che et al. |
| 2002/0154000 A1 | 10/2002 | Kline |
| 2002/0162032 A1 | 10/2002 | Gundersen et al. |
| 2003/0039257 A1 | 2/2003 | Manis |
| 2003/0046377 A1 | 3/2003 | Daum et al. |
| 2003/0052770 A1 | 3/2003 | Mansfield, Jr. et al. |
| 2003/0103303 A1 | 6/2003 | Barnes et al. |
| 2003/0129978 A1 | 7/2003 | Akiyama et al. |
| 2003/0133420 A1 | 7/2003 | Haddad |
| 2003/0160595 A1 | 8/2003 | Provanzana et al. |
| 2003/0169155 A1 | 9/2003 | Mollenkopf et al. |
| 2003/0201873 A1 | 10/2003 | Cern |
| 2003/0224784 A1 | 12/2003 | Hunt et al. |
| 2004/0024483 A1 | 2/2004 | Holcombe |
| 2004/0027748 A1 | 2/2004 | Kojovie et al. |
| 2004/0036478 A1 | 2/2004 | Logvinov et al. |
| 2004/0047335 A1 | 3/2004 | Proctor et al. |
| 2004/0061616 A1 | 4/2004 | Fischer et al. |
| 2004/0064276 A1 | 4/2004 | Villicana |
| 2004/0083066 A1 | 4/2004 | Hayes et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0153215 A1 | 8/2004 | Kearney et al. |
| 2004/0176026 A1 | 9/2004 | Gainey et al. |
| 2004/0189317 A1 | 9/2004 | Borchert et al. |

| | | | |
|---|---|---|---|
| 2004/0198453 A1 | 10/2004 | Cutrer et al. | |
| 2004/0223470 A1 | 11/2004 | Smith | |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2004/0239522 A1 | 12/2004 | Gallagher | |
| 2005/0040809 A1 | 2/2005 | Uber, III et al. | |
| 2005/0046550 A1 | 3/2005 | Crenshaw et al. | |
| 2005/0055729 A1 | 3/2005 | Atad et al. | |
| 2005/0057227 A1 | 3/2005 | Rockwell | |
| 2005/0063422 A1 | 3/2005 | Lazar et al. | |
| 2005/0068915 A1 | 3/2005 | Atad et al. | |
| 2005/0076149 A1 | 4/2005 | McKown et al. | |
| 2005/0085259 A1 | 4/2005 | Conner et al. | |
| 2005/0111533 A1 | 5/2005 | Berkman | |
| 2005/0125104 A1 | 6/2005 | Wilson et al. | |
| 2005/0128057 A1 | 6/2005 | Mansfield et al. | |
| 2005/0164666 A1 | 7/2005 | Lang et al. | |
| 2005/0168326 A1 | 8/2005 | White et al. | |
| 2005/0194944 A1 | 9/2005 | Folts et al. | |
| 2005/0207079 A1 | 9/2005 | Tiller et al. | |
| 2005/0226200 A1 | 10/2005 | Askildsen et al. | |
| 2005/0239400 A1 | 10/2005 | Narikawa | |
| 2005/0249245 A1 | 11/2005 | Hazani et al. | |
| 2005/0251401 A1 | 11/2005 | Shuey | |
| 2005/0259668 A1 | 11/2005 | Kim | |
| 2005/0285720 A1 | 12/2005 | Cope et al. | |
| 2006/0007016 A1 | 1/2006 | Borkowski et al. | |
| 2006/0031180 A1 | 2/2006 | Tamarkin et al. | |
| 2006/0045105 A1 | 3/2006 | Dobosz et al. | |
| 2006/0046766 A1 | 3/2006 | Hair et al. | |
| 2006/0052906 A1 | 3/2006 | Kates | |
| 2006/0060007 A1 | 3/2006 | Mekhanoshin et al. | |
| 2006/0091877 A1 | 5/2006 | Robinson et al. | |
| 2006/0106554 A1 | 5/2006 | Borkowski et al. | |
| 2006/0119368 A1 | 6/2006 | Sela et al. | |
| 2006/0125422 A1 | 6/2006 | Costa | |
| 2006/0132299 A1 | 6/2006 | Robbins et al. | |
| 2006/0145834 A1 | 7/2006 | Berkman et al. | |
| 2006/0165054 A1 | 7/2006 | Iwamura | |
| 2006/0171085 A1 | 8/2006 | Keating | |
| 2006/0176631 A1 | 8/2006 | Cannon | |
| 2006/0181284 A1 | 8/2006 | Fraedrich | |
| 2006/0187074 A1 | 8/2006 | O'Sullivan et al. | |
| 2006/0220833 A1 | 10/2006 | Berkman | |
| 2006/0262881 A1 | 11/2006 | Cern | |
| 2006/0286927 A1 | 12/2006 | Berkman | |
| 2006/0291546 A1 | 12/2006 | Zitting | |
| 2006/0291575 A1 | 12/2006 | Berkman et al. | |
| 2007/0002771 A1 | 1/2007 | Berkman et al. | |
| 2007/0002772 A1 | 1/2007 | Berkman et al. | |
| 2007/0002876 A1 | 1/2007 | Berkman et al. | |

FOREIGN PATENT DOCUMENTS

| | | |
|---|---|---|
| DE | 100 61 584 A1 | 6/2002 |
| DE | 100 61 586 A1 | 6/2002 |
| EP | 0 581 351 A1 | 2/1994 |
| EP | 0 632 602 A2 | 1/1995 |
| EP | 1 253 699 A2 | 10/2002 |
| GB | 2 293 950 A | 4/1996 |
| JP | 1276933 | 11/1989 |
| WO | WO-99/59261 A1 | 11/1999 |
| WO | WO-01/08321 A1 | 2/2001 |
| WO | WO-03/039022 A1 | 5/2003 |
| WO | WO-2004/008656 A1 | 1/2004 |

OTHER PUBLICATIONS

"Centralized Commercial Building Applications with the Lonworks® PLT-21 Power Line Transceiver", *Lonworks Engineering Bulletin, Echelon*, (Apr. 1997), 1-22.

"Demand Side Management with LONWORKS® Power Line Transceivers", *LONWORKS Engineering Bulletin*, (Dec. 1996), 1-36.

"Embedded Power Line Carrier Modem", *Archnet Electronic Technology*, http://www.archnetco.com/english/product/ATL90.htm, (2001), 1-3.

"EMETCON Automated Distribution System", *ABB Power T & D Company, Inc.* (Jan. 1990),1-14.

"EMETCON Automated Distribution System: Communications Guide", *Westinghouse ABB Power T & D Company Technical Manual 42-6001A.*, (Sep. 1989), 1-55.

"IEEE Guide for Power-Line Carrier Applications, ANSI/IEEE Std 643-1980", *The Institute of Electrical and Electronics Engineers, Inc.*, (1980), 1-80.

"Outlook Conference 2004: Amperion Deployment Overview", *Primen Conference*, (May 7, 2004),1-10.

"PLC, A New Competitor in Broadband Internet Access", *Power Line Communications Conference*, (Dec. 12, 2001), 1-60.

"Tohoku Electric Develops High-Speed Communications System Using Power Distribution Lines", *Tohoku Currents* (http://www.tohoku-epco.co.jp/profil/kurozu/c_vol8_1/art04.htm), (1998),1-2.

Abraham, K C., et al., "A Novel High-Speed PLC Communication Modem", *IEEE Transactions on Power Delivery*, (Oct. 1992), 1760-1768.

Chang, SS L., "Power-Line Carrier", *Fundamentals Handbook of Electrical and Computer Engineering, vol. II-Communication, Control, Devices and Systems*, (1983), 617-627.

De Wilde, W R., et al., "Upwards to a Reliable Bi-Directional Communication Link on the LV Power Supplies for Utility Services: Field Tests in Belgium", *Sixth International Conference on*, (Apr. 3-5, 1990), 168-172.

Gutzwiller, F W., et al., "Homenet: A Control Network for Consumer Applications", *IEEE Transactions on Consumer Electronics*, (Aug. 1983),297-304.

Horiguchi, Akira, "High Speed Power Line Communication Technology", *Mitsubishi Electric Advance vol. 109*, (Mar. 2005), 1-27.

Hunt, J M., et al., "Electrical Energy Monitoring and Control System for the Home", *IEEE Transactions on Consumer Electronics*, (Aug. 1986), 578-583.

Lokken, G , et al., "The Proposed Wisconsin Eectric Power Company Load Management System Using Power Line Carrier Over Distribution Lines", *1976 National Telecommunications Conference, IEEE*, (1976),2.2-12.2-3.

Russell, B D., "Communication Alternatives for Distribution Metering and Load Management", *IEEE Transactions on Power Apparatus and Systems*, (1980), 1448-1455.

"Power Line Communications", *Power Line Communications*, www.plexeon.com/power.html, (1998), 1-2.

Feduschak, N A., "Waiting in the Wings: Is Powerline Technology Ready to Compete with Cable?", www.cabletoday.com/ic2/archives/0301/0301powerline.htm, (Mar. 2001), 1-5.

* cited by examiner

AUTOMATED METER READING POWER LINE COMMUNICATION SYSTEM AND METHOD

CROSS REFERENCE TO RELATED APPLICATIONS

This application is a continuation-in-part of and claims priority to U.S. patent application Ser. No. 10/075,332, filed Feb. 14, 2002, which claims priority to U.S. Provisional Patent Application Ser. Nos. 60/268,519 and 60/268,578, (both filed Feb. 14, 2001); and this application is a continuation-in-part of and claims priority to U.S. patent application Ser. No. 11/134,377 filed May 23, 2005, which is a continuation of U.S. patent application Ser. No. 09/835,532, now U.S. Pat. No. 6,958,680, filed Apr. 16, 2001, which claims priority to U.S. Provisional Patent Application Ser. No. 60/197,615 filed Apr. 14, 2000, all of which are hereby incorporated herein by reference in their entirety for all purposes.

FIELD OF THE INVENTION

The present invention generally relates to data communications over a power distribution system and more particularly, to a power line communications system for wirelessly communicating utility meter data and other data.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices; Internet service providers, and the like.

There are many challenges to overcome in order to use power lines for data communication. Power lines are not designed to provide high speed data communications and can be very susceptible to interference. Additionally, federal regulations limit the amount of radiated energy of a power line communication system, which therefore limits the strength of the data signal that can be injected onto power lines (especially overhead power lines). Consequently, due to the attenuation of power lines, communications signals typically will travel only a relatively short distance on power lines. In addition, the distance may vary from location to location.

In the past, utilities typically have sent personnel to manually read and record the meter data, which can be expensive. Automated meter reading has been investigated as a means for reducing the cost of reading meters. However, until now, there has been no economically feasible means of communicating the data to the utility. This fact, along with the cost of replacing old meters in a large geographical area, have hindered wide scale adoption of automated meter reading.

Thus, there is a need for a power line communications system and method that facilitates automated power meter reading and reliable communications of data signals that can be dynamically configured and reconfigured by a network management system. These and other advantages may be provided by various embodiments of the present invention.

SUMMARY OF THE INVENTION

The present invention provides an automated meter reading power line communications system and method of use. In one embodiment, the method may include measuring the utility usage of a first customer premises to provide first utility usage data, storing the first utility usage data in memory of a first device, wirelessly transmitting the first utility usage data from the first device, receiving the wirelessly transmitted first utility usage data at a second device coupled to a medium voltage power line, and transmitting the first utility usage data over the medium voltage power line.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, PLCS, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, development interfaces, and hardware are omitted so as not to obscure the description of the present invention.

Figure 1:
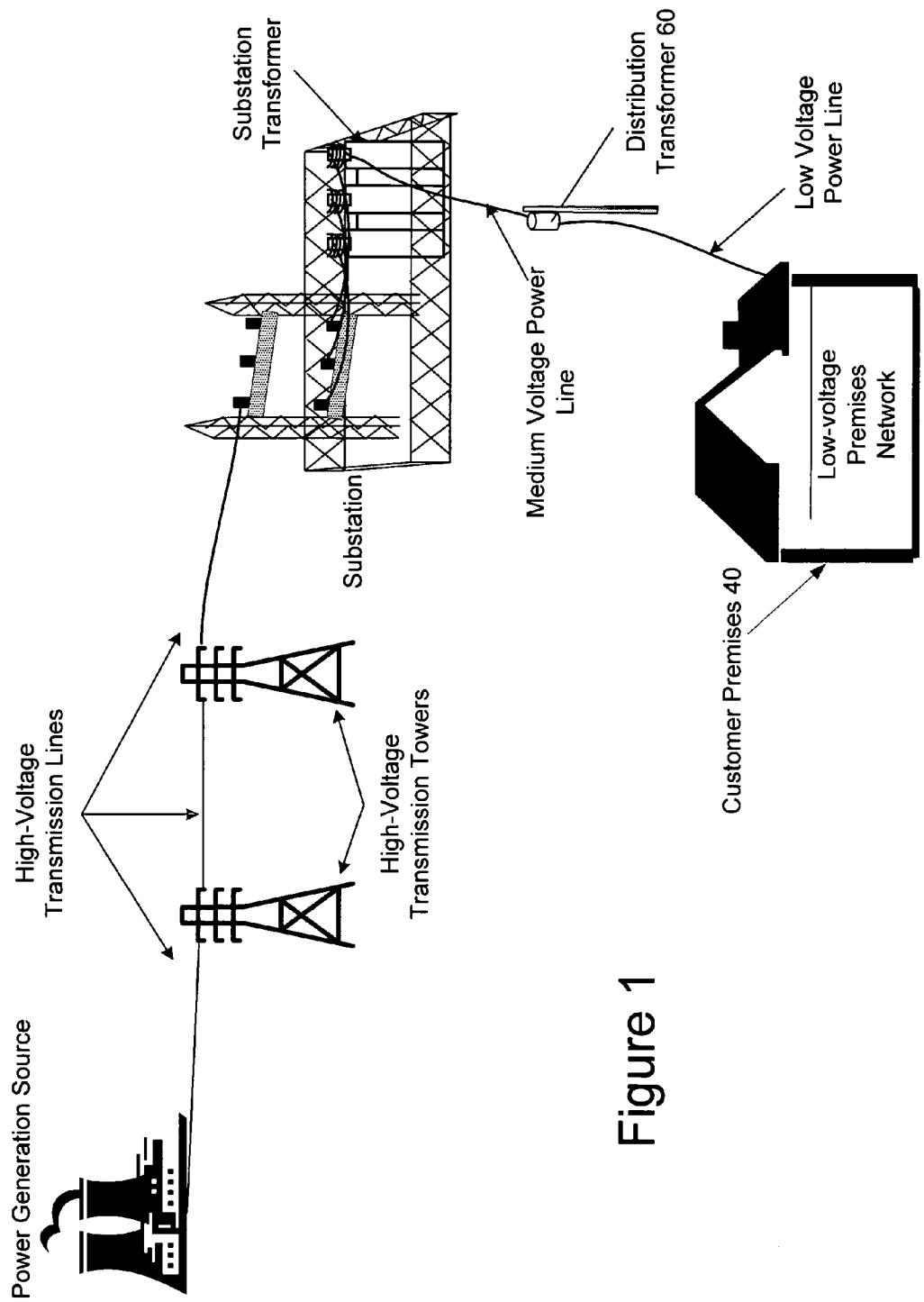
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 800 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Figure 2:
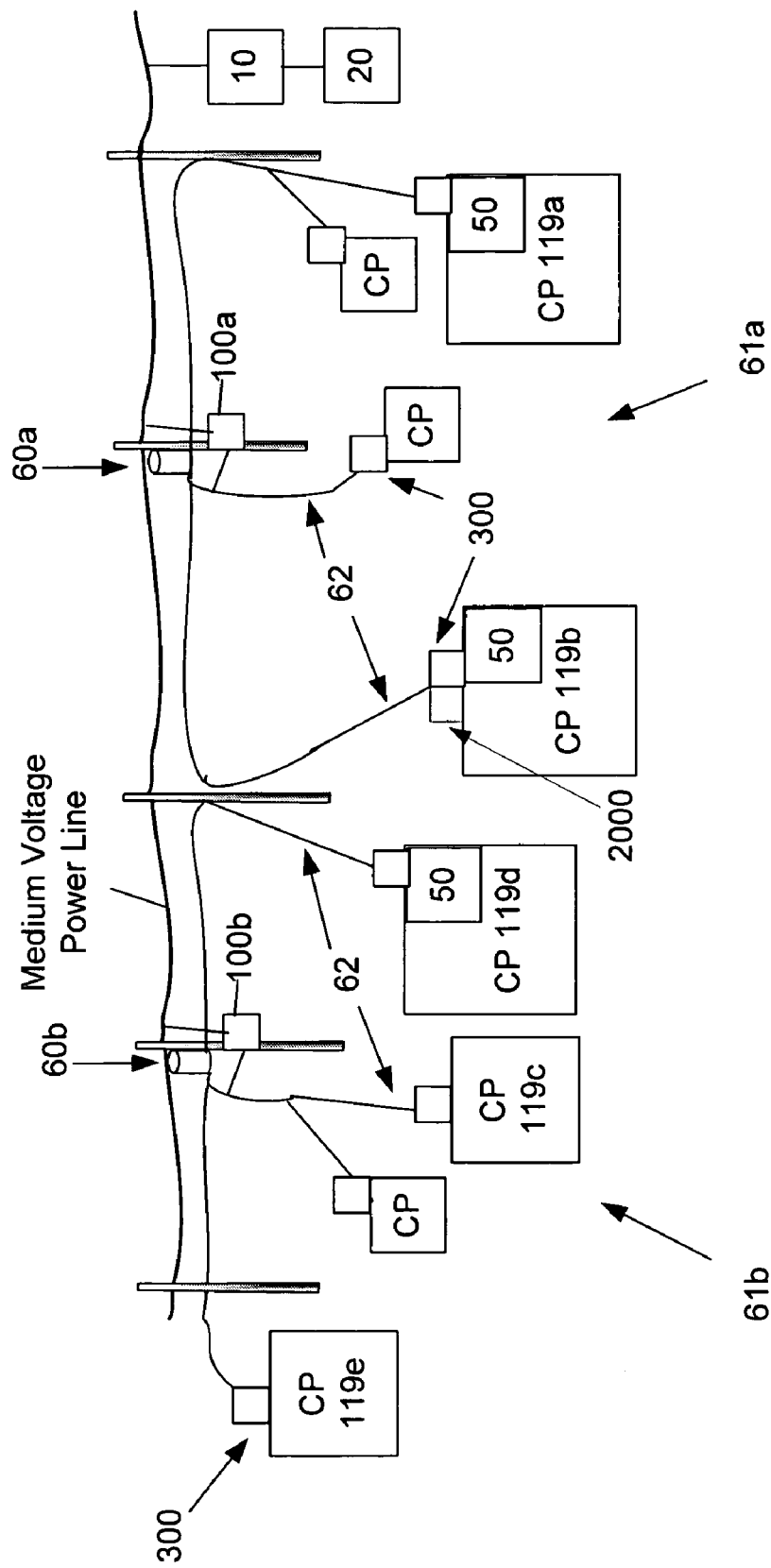
FIG. 2 is a diagram of a portion of a power line communications system, with which an embodiment of the present invention may be used.

One example of a portion of a conventional PLCS is shown in FIG. 2. In this example, two bypass devices (BD) 100a and 100b are used to communicate data signals around the distribution transformers that would otherwise filter such data signals, preventing them from passing through the transformer or significantly degrading them. Thus, the BD 100 is the gateway between the LV power line subnet (i.e., the LV power line connected to the distribution transformer and the devices that are communicatively coupled to the LV power lines) and the MV power line and communicates signals to and from user devices at the customer premises (CP) via the low voltage subnet 61.

In this example embodiment, the BD 100 provides communication services for the user devices, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 may be communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium that comprises the backhaul link.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters. Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device, which provides the data to a power line modem (PLM) 50, which is well-known in the art.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM 50 transmits the data received from the user device through the LV power lines to a BD 100 and provides data received from the LV power line to the user device. The PLM 50 may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically receives data from the user devices coupled to its LV power line subnet and then transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination. A detailed description of an example PLCS, its components and features is provided in U.S. patent application Ser. No. 11/091, 677 filed Mar. 28, 2005, entitled "Power Line Repeater System and Method", which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology.

Referring to FIG. 2, this example PLCS includes a BD 100 at each distribution transformers 60a and 60b to service the user devices coupled to the respective LV power line subnet. Thus, BD 100a is coupled to backhaul point 10 via the MV power line and also coupled to LV power line subnet 61a to provide communications to the user devices coupled thereto. In this example, LV power line subnet 61a includes the LV power lines coupled to distribution transformer 60a, which may be connected to between one and ten (and sometimes more) customer premises CP. One or more of the customer premises may include one or more power line modems 50 and associated user devices that are connected to the internal power lines such as, for example, at CP 119a and 119b.

Similarly, BD 100b is coupled to backhaul point 10 via the MV power line and also coupled to LV power line subnet 61b to provide communications to the user devices coupled thereto. In this example, LV power line subnet 61b includes the LV power lines coupled to distribution transformer 60b. One or more of the customer premises 119 receiving power via LV power line subnet 61b may include one or more PLMs 50 and the associated user devices connected thereto. Thus, as shown in FIG. 2, the bypass device 100 typically communicates via the external low voltage power lines 62, the power meter 300, and internal power lines to the user device. In some instances, however, the power meter, the length of the low voltage power lines (both internal and external) may attenuate the data signals to the point where communications are prevented or degraded and/or are no longer reliable. Additionally, sometimes the LV power line link may be fully utilized for user data communications.

Thus, the prevent invention may provide an additional communication link to the customer premises (or the vicinity thereof) for communications with the utility meter(s) and/or user devices. For example, if the power line communication channel becomes inoperative, the wireless link may be used to provide communications.

Figure 3:
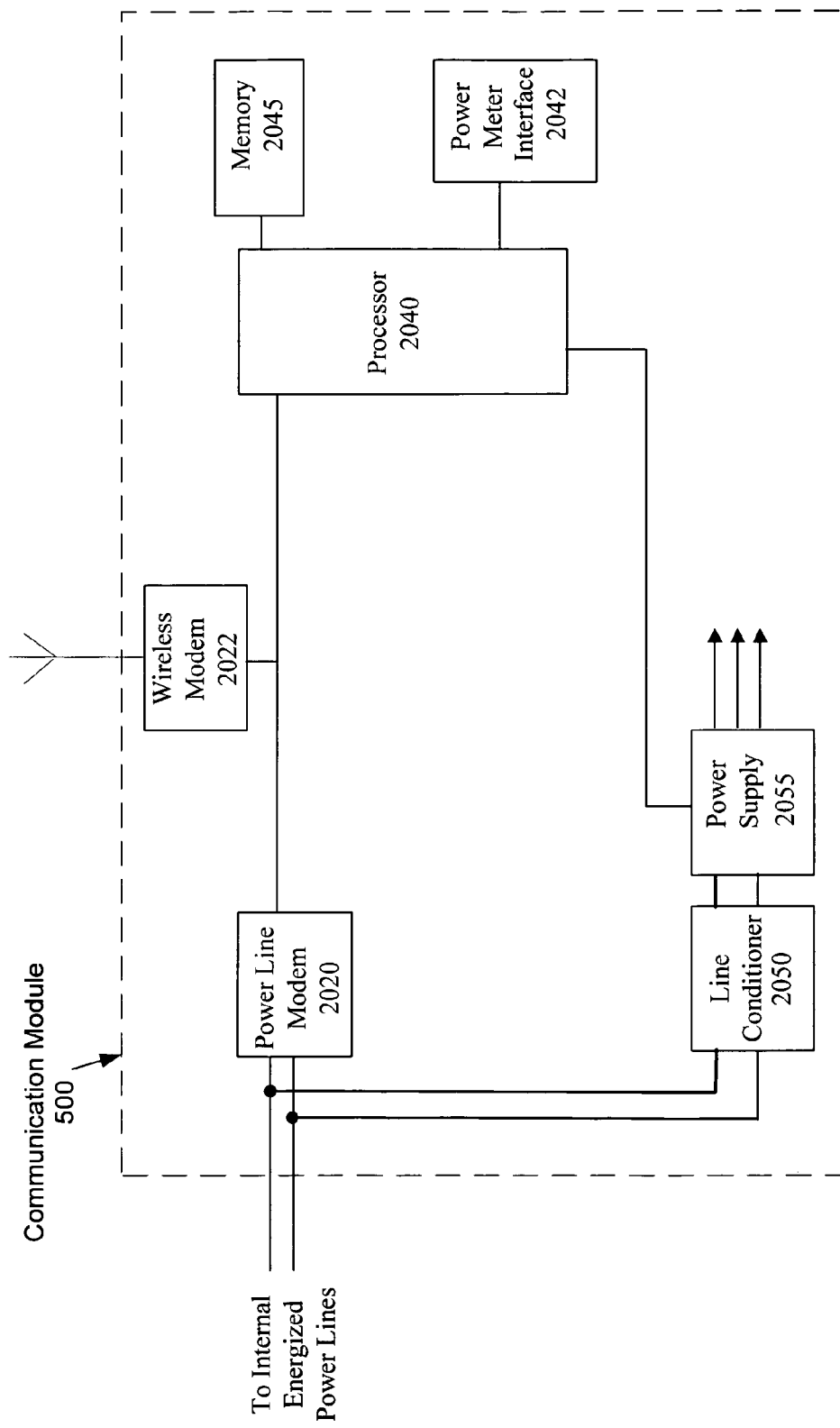
FIG. 3 is a diagram of an example embodiment of a communication module according to an example embodiment of the present invention.

FIG. 3 depicts an example communication module (CM) 500 that facilitates wireless reception and transmission of data from an automated power meter 300. This example embodiment includes a wireless modem 2022 which provides communications with a bypass device 100, or other wireless enabled devices. The modem 2022 may be compatible with an IEEE 802.11 or other protocol and may communicate any suitable frequency band such as a licensed band (e.g., 6 GHz, 11 GHz, 18 GHz, 23 GHz, 24 GHz, 28 GHz, or 38 GHz band) or unlicensed frequency band (e.g., 900 MHz (e.g., 902-928 MHz), 2.4 GHz, 5.8 Ghz, 24 GHz, 38 GHz, or 60 GHz (i.e., 57-64 GHz)).

The wireless modem 2022 may be communicatively coupled to the processor 2040. The processor 2040 may be in communication with memory 2045, which may include volatile and non-volatile random access memory (RAM) which may be used to store power usage data collected from the meter 300 and program code to be executed by the processor 2040. New program code, requests for data, and other commands may be received via the wireless modem 2022 from a network element such as a bypass device, of the PLCS. The new code, requests for data, and/or other commands may then be stored in flash memory for execution by the processor 2040.

The processor 2040 may also be in communication with the meter via a power meter interface 2042 in order to receive data from the meter itself and to perform other AMR processes. This example embodiment also includes a power line modem 2020 to communicate with the BD 100 or power line modems in the customer premises. Other embodiments may not need to have a power line modem 2020. The module 500 may also include a line conditioner and power supply 2055 coupled to the processor 2040, wireless modem 2022, power line modem 2020 and other components to provide power thereto.

The meter data may be transmitted by the CM 500 by wireless modem 2022 to a power line communications system network element, which may be, for example, a transformer bypass device 100. The network element may then transmit the meter data (e.g., via the MV power line) to an upstream device (e.g., a backhaul device 10), which further transmits the meter data upstream for eventual reception by utility provider. During operation, the module 500 may periodically transmit utility usage data and subsequently await an acknowledgment from the receiving device (e.g., a BD 100) that the data has been received. If no acknowledgement is received after a predetermined time period (e.g., fifteen seconds), the module may re-transmit the data. If after five attempts no acknowledgement is received the process may begin again after a second predetermined time period (e.g., fifteen minutes). After a predetermined number of processes have been completed (e.g., 5), the module may attempt to transmit an alert over the power lines (if a power line modem is included in the device).

Also, the module may receive user data, request for utility usage data, new software, configuration commands, or other data wirelessly or, if, the module 500 includes a power line modem 2020, via the LV power line modems. In one embodiment, data transmitted by the BD 100 and the CM 500 is differentially transmitted over the two LV power line energized conductors. In another embodiment, the data signals are inductively coupled onto one or both energized conductors. User data received (from the BD 100 or originating from user device in a customer premises) may be re-transmitted wirelessly or over the LV power lines (if a power line modem is included in the module 500). Thus, data may be received wirelessly from a BD 100, a user device, or another utility meter and be re-transmitted wirelessly or over the power lines and data may be received via the LV power lines from a BD 100, a user device, or another utility meter and be re-transmitted wirelessly or over the power lines.

Figure 4:
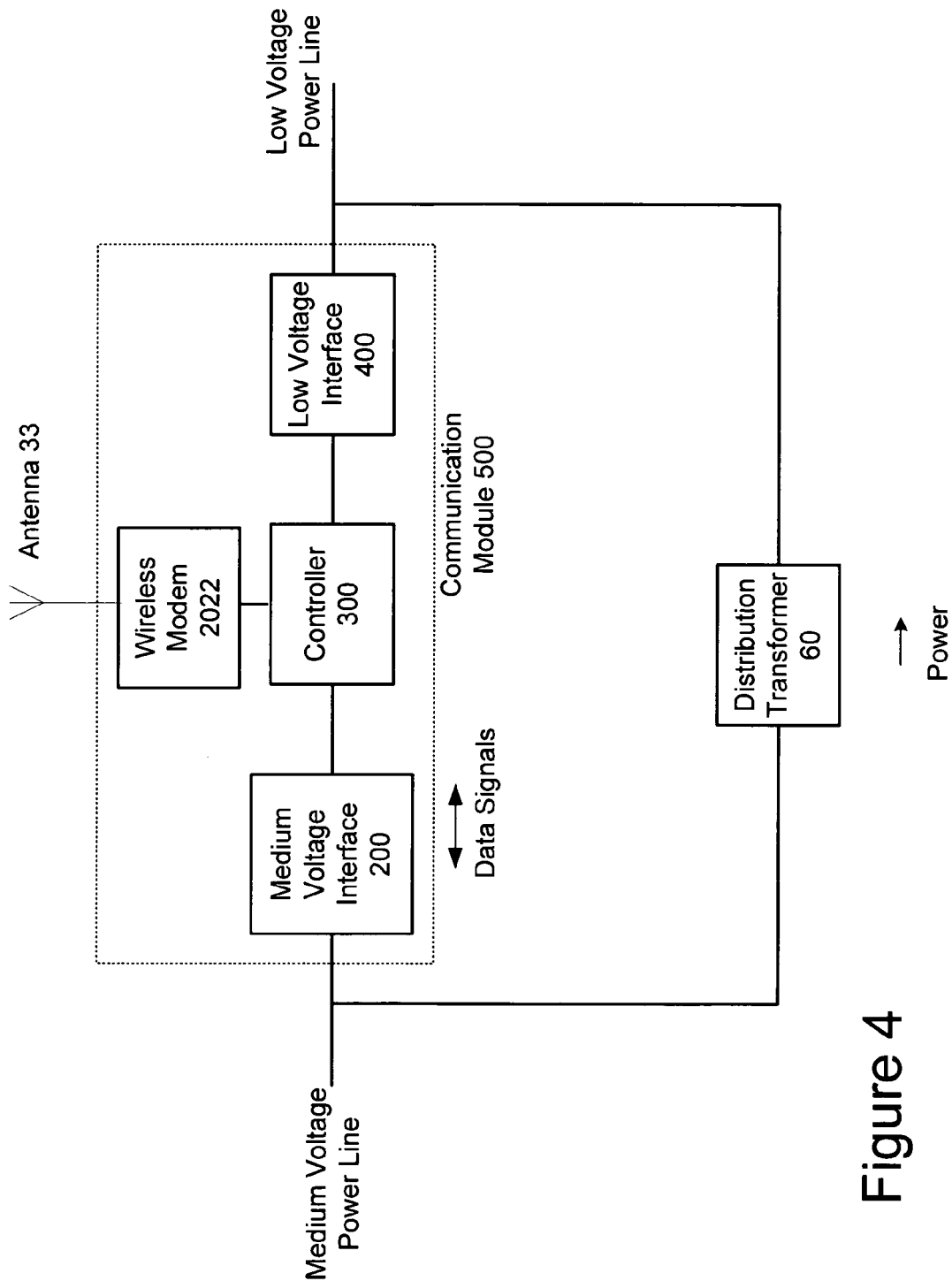
FIG. 4 is a block diagram of a bypass device, in accordance with an example embodiment of the present invention.

FIG. 4 depicts an embodiment of the bypass device (BD) 100 which includes a MV power line interface (MVI) 200, a controller 300, a wireless modem 2044, and a LV power line interface (LVI) 400. Both the MVI, wireless modem and the LVI may include an adaptive and/or dynamic transmitter to transmit signals at various power levels as determined by the controller 300, which may change the output power in response to a command from the PLS or automatically due to changes communications. Additionally, in one embodiment the wireless modem 2044 may transmit and/or receive in a plurality of frequency bands in response to commands or signals from the controller 300. The plurality of frequency bands may comprise or consist of multiple sub-bands in any of the frequency bands identified above such as, for example, 903-904 MHz, 904-905 MHz, and 905-906 MHz. The BD 100 is controlled by a processor executing executable program code and associated peripheral circuitry, which form part of the controller 300. The controller 300 includes memory that stores, among other things, routing information and program code, which controls the operation of the processor.

Figure 5:
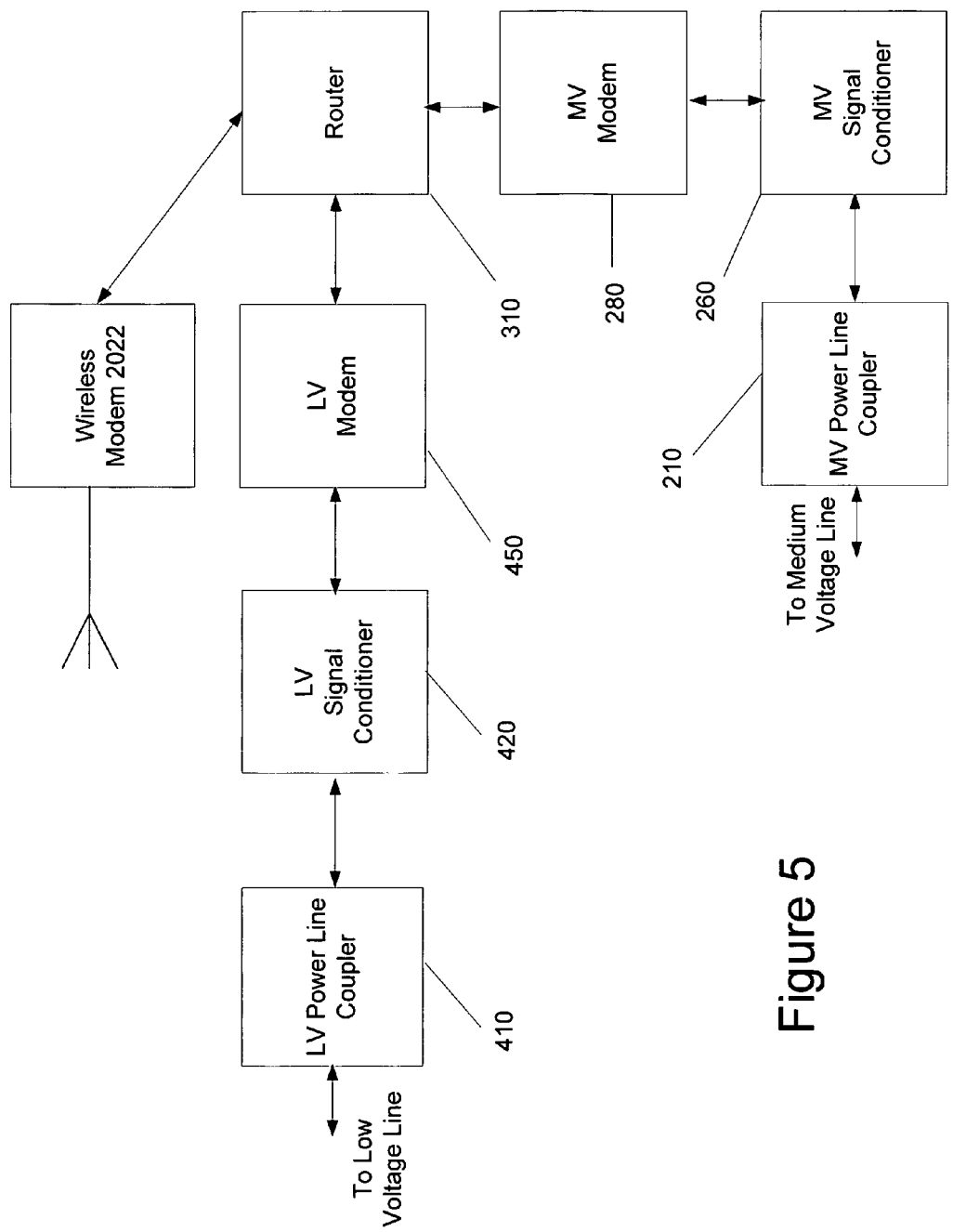
FIG. 5 is a block diagram of a bypass device, in accordance with an example embodiment of the present invention.

Referring to FIG. 5, the LVI 400 may include a LV power line coupler 410, a LV signal conditioner 420, and a LV modem 450. The router 310 forms part of the controller 300 and performs routing functions. Router 310 may perform routing functions using layer 3 data (e.g., IP addresses), layer 2 data (e.g., MAC addresses), or a combination of layer 2 and layer 3 data (e.g., a combination of MAC and IP addresses). The MVI 200 may include a MV modem 280, a MV signal conditioner 260, and a power line coupler 210. In addition to routing, the controller 300 may perform other functions including controlling the operation of the LVI 400 and MVI 200 functional components and responding to PLS commands and requests. A more complete description of the hardware, firmware, of the BD 100 and its functionality is described below.

This embodiment of the BD 100 provides bi-directional communication of a first communications path from the LV power line to the MV power line and a second path from the MV power line to the LV power line. Thus, BD 100 can receive and transmit data to one or more user devices in one or more customer premises via the LVI 400, which may be connected to a plurality customer premises via a plurality of LV power lines. The BD 100 may also receive and transmit data with other elements, such as one or more BPs 10 and other BDs 100, via the MVI 300. In addition, the BD 100 may wirelessly receive and transmit data through antenna 33 via wireless modem 2044 with meters on the same LV subnet or with meters on a different nearby LV subnet.

FIG. 5 illustrates an example BD 100. The BD 100 may be coupled to the LV power line via the LV coupler 410, which is coupled to the LV signal conditioner 420. Any type of coupler may be used including, but not limited to an inductive coupler, a capacitive coupler, a conductive coupler, or a combination thereof. The LV signal conditioner 420 may include an amplifier and filter and a transmit/receive switch, for transmission and reception of data.

LV Modem

The LV modem 450 receives and transmits data over the LV power line subnet and may include additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. In the present example embodiment, the LV modem 450 is formed, at least in part, by part number INT51X1, which is an integrated power line transceiver circuit incorporating most of the above-identified submodules, and which is manufactured by Intellon, Inc. of Ocala, Fla.

The LV modem 450 may provide decryption, source decoding, error decoding, channel decoding, and media access control (MAC) all of which are known in the art and, therefore, not explained in detail here. With respect to MAC, however, the LV modem 450 may examine information in the packet to determine whether the packet should be ignored or passed to the router 310. For example, the modem 450 may compare the destination MAC address of the incoming packet with the MAC address of the LV modem 450 (which is stored in the memory of the LV modem 450). If there is a match, the LV modem 450 may remove the MAC header of the packet and pass the packet to the router 310. If there is not a match, the packet may be ignored.

Router

The router 310 may perform prioritization, filtering, packet routing, access control, and encryption. The router 310 of this example embodiment of the present invention uses a table (e.g., a routing table) and programmed routing rules stored in memory to determine the next destination of a data packet. The table is a collection of information and may include information relating to which interface (e.g., LVI 400 or MVI 200) leads to particular groups of addresses (such as the addresses of the user devices (including control devices) connected to the customer LV power lines and BDs 100), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line or receiver and the destination address corresponds to a user device (e.g., control device) connected to the LV power line), repeated on the MV line (e.g., if the BD 100 is acting as a repeater), or be ignored (e.g., if the address does not correspond to a user device connected to the LV power line or to the BD 100 itself).

As an example, the table may include information such as the IP addresses (and potentially the MAC addresses) of the user devices on the BD's 100 LV subnet, the utility meters with which it can communicate, the MAC addresses of the PLMs 50 on the BD's 100 LV subnet, the addresses of the control devices on the LV subnet, the MV subnet mask (which may include the MAC address and/or IP address of the BD's BP 10), the IP (and/or MAC) addresses of BDs 100 (e.g., for which the device may be repeating), and the IP address of the LV modem 450 and MV modem 280. Based on the-destination address of the packet (e.g., an IP address), the router may pass the packet to the MV modem 280 for transmission on the MV power line. Alternately, if the destination address of the packet matches the address of the BD 100, the BD 100 may process the packet as a command such as request for a pay-per-view programming.

The router 310 may also prioritize transmission of packets. For example, data packets determined to be voice packets may be given higher priority for transmission through the BD 100 than data packets so as to reduce delays and improve the voice connection experienced by the user. Routing and/or prioritization may be based on IP addresses, MAC addresses, subscription level, type of data (e.g., power usage data or other enhanced power distribution system data may be given lower priority than voice or computer data), or a combination thereof (e.g., the MAC address of the PLM or IP address of the user device). Additionally, data to or from the one or more utility meters may be given a lower priority than data from user devices (which may include web page data, IP television data, voice data, etc.)

MV Modem

The MV modem 280, which is coupled to the router 310, receives and transmits data over the MV power line. Similar to the LV modem 450, the MV modem 280 receives data from the router 310 and includes a modulator and demodulator. In addition, the MV modem 280 also may include one or more additional functional submodules such as an ADC, DAC, memory, source encoder/decoder, error encoder/decoder, channel encoder/decoder, MAC controller, encryption module, frequency conditioning module (to upband and/or downband signals) and decryption module. These functional submodules may be omitted in some embodiments, may be integrated into a modem integrated circuit (chip or chip set), or may be peripheral to a modem chip. In the present example embodiment, the MV modem 280 is formed, at least in part, by part number INT51X1, which is an integrated power line transceiver circuit incorporating most of the identified submodules and which is manufactured by Intellon, Inc. of Ocala, Fla.

The incoming data from the router 310 (or controller) is supplied to the MV modem 280, which provides MAC processing, for example, by adding a MAC header that includes the MAC address of the MV modem 280 as the source address and the MAC address of the BP 10 (and in particular, the MAC address of the MV modem of the BP) or BD 100 as the destination MAC address. In addition, the MV modem 280 also provides channel encoding, source encoding, error encoding, and encryption. The data is then modulated and provided to the DAC to convert the digital data to an analog signal.

The term "router" is sometimes used to refer to a device that routes data at the IP layer (e.g., using IP addresses). The term "switch" or "bridge" are sometimes used to refer to a device that routes at the MAC layer (e.g., using MAC addresses). Herein, however, the terms "router", "routing", "routing functions" and the like are meant to include both routing at the IP layer and MAC layer. Consequently, the router 310 of the present invention may use MAC addresses instead of, or in addition to, IP addresses to perform routing functions.

Signal Conditioners

The signal conditioners 420 and 260 may provide filtering (anti-alias, noise, and/or band pass filtering) and amplification. In addition, the signal conditioners may provide frequency translation.

MV Power Coupler Line

The coupling device 210 may be inductive, capacitive, conductive, a combination thereof, or any suitable device for communicating data signals to and/or from the MV power line.

Controller

As discussed, the controller 300 includes the hardware and software for managing communications and control of the BD 100. In this embodiment, the controller 300 includes an IDT 32334 RISC microprocessor for running the embedded application software and also includes flash memory for storing the boot code, device data and configuration information (serial number, MAC addresses, subnet mask, and other information), the application software, routing table, and the statistical and measured data. This memory includes the program code stored therein for operating the processor to perform the routing functions described herein.

This embodiment of the controller also includes random access memory (RAM) for running the application software and temporary storage of data and data packets. This embodiment of the controller 300 also includes an Analog-to-Digital Converter (ADC) for taking various measurements, which may include measuring the temperature inside the BD 100 (through a temperature sensor such as a varistor or thermistor), for taking power quality measurements, detecting power outages, measuring the outputs of feedback devices, and others. The embodiment also includes a "watchdog" timer for resetting the device should a hardware glitch or software problem prevent proper operation to continue.

This embodiment of the controller 300 also includes an Ethernet adapter, an optional on-board MAC and physical (PHY) layer Ethernet chipset that can be used for converting peripheral component interconnect (PCI) to Ethernet signals for communicating with the backhaul side of the BD 100. The RJ45 connector provides a port for the wireless modem 2044 (which may be a 802.11 compliant transceiver) for communicating wirelessly to the meter, BP 10 or BD 100, which, of course, would include a similar transceiver.

In addition to storing a real-time operating system, the memory of controller 300 of the BD 100 also includes various program code sections such as a receiver control software, software upgrade handler, software upgrade processing software, the PLS command processing software (which receives commands from the PLS, and processes the commands, and may return a status back to the PLS), the ADC control software, the power quality monitoring software, the error detection and alarm processing software, the data filtering software, the traffic monitoring software, the network element provisioning software, and a dynamic host configuration protocol (DHCP) Server for auto-provisioning user devices (e.g., user computers) and associated PLMs.

During operation, the BD 100 may periodically transmit a request for, or anticipate reception of, utility usage data and, upon reception transmit an acknowledgment to the CM 500. The request may be send over the LV power lines or wirelessly depending on the implementation. If no data is received from the communication module after a predetermined time period (e.g., one hour or one day) or in response to a transmitted request, the BD may re-transmit the request. If no data is received again, the BD may transmit an alert over the MV power line to the PLS, which may transmit a notification to the utility to dispatch a repair crew to replace the meter and/or communication module. The BD may provide communications to a plurality of utility meters (e.g., power, water, and/or gas) and user devices. Thus, the CM associated with each utility meter may have a different address and be separately addressable by the BD 100. Once the utility usage data is received, the BD may store the data and subsequently transmit the data over the MV power line to the power line server and/or a destination designated by the utility (which may require that the BD or BP add a destination address to the data packet carrying the utility usage data).

In alternate embodiment, the BD 100 does not include a LVI, but may connect to the LV power lines to receive power therefrom, but does not communicate over the LV power lines. Thus, the BD 100 may include an MVI 200 (including an MV modem) and a wireless modem 2044 for communicating with utility meters and/or user devices. For example, some bypass devices 100 may not have any subscribers on their LV subnet. Consequently, such an embodiment of the present invention may not include a low voltage port on the device 100 because the BD 100 can communicate meter data wirelessly. Additionally, bypass devices with the wireless modem may be configured to communicate with numerous meters including both meters connected to the BD's LV subnet and to meters that are connected to other LV subnets (and with which there is no conductive path for data communications). Likewise, some utility meters (e.g., gas or water) may include a battery powered communication module and not be connected to the power lines. For such meters there often is no conductive path for data over power lines. Finally, the proliferation of wireless local area networks and cordless telephones (which either may often use the 2.4 GHz or 5.8 GHz) in a given area may make one or more of the 900 MHz frequency sub-bands attractive for implementing the present invention. Additionally, the 900 MHz may provide better penetration to or into customer premises and also allow for economic production of the invention.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing communicating utility usage data, comprising:
   receiving first utility usage data of a first customer premises;
   storing the first utility usage data in memory of a first device;
   wirelessly transmitting the first utility usage data from the first device;
   receiving the wirelessly transmitted first utility usage data at a second device coupled to a medium voltage power line;
   transmitting the first utility usage data over the medium voltage power line;
   measuring the utility usage of a second customer premises to provide second utility usage data;
   storing the second utility usage data in memory of a third device;
   wirelessly transmitting the second utility usage data from the third device;
   receiving the wirelessly transmitted second utility usage data at the second device; and
   transmitting the second utility usage data over the medium voltage power line.

2. The method of claim 1, wherein the first utility usage data comprises power usage data.

3. The method of claim 1, wherein the first utility usage data comprises water usage data.

4. The method of claim 1, wherein the first utility usage data comprises gas usage data.

5. The method of claim 1, wherein the second device is further coupled to a low voltage power line.

6. The method of claim 5, wherein the second device is configured to provide communication services over the low voltage power line.

7. The method of claim 6, wherein the second device includes a router and is configured to route data received wirelessly and data received via the low voltage power lines.

8. The method of claim 6, where the second device is configured to assign a priority to at least some data received via the low voltage power lines that is higher than data received wirelessly.

9. The method of claim 1, wherein the first utility usage data and second utility usage data are different types of utility usage data.

10. The method of claim 1, wherein the first device and second device are coupled to different low voltage power lines.

11. The method of claim 1, wherein the first utility usage data is wirelessly received in a frequency range of about 902-928 megahertz.

12. The method of claim 1, further comprising measuring the utility usage of the first customer premises to provide the first utility usage data.

13. The method of claim 1, wherein the first device comprises a utility meter.

14. A method of using a device coupled to a medium voltage power line, comprising:
    wirelessly receiving first utility usage data from a first device;
    wirelessly receiving second utility usage data from a second device;
    receiving user data from a consumer device; and
    transmitting the first utility usage data, the second utility usage data, and the user data over the medium voltage power line.

15. The method of claim 14, wherein the first utility usage data comprises power usage data.

16. The method of claim 15, wherein the second utility usage data comprises gas usage data.

17. The method of claim 14, wherein the first utility usage data comprises water usage data.

18. The method of claim 14, wherein the first utility usage data comprises gas usage data.

19. The method of claim 14, further comprising according a priority to the user data that is higher than that of the first utility usage data.

20. The method of claim 14, wherein the first utility usage data and the second utility usage data are different types of utility data.

21. The method of claim 14, where in the first utility usage data is wirelessly received in frequency range of about 902-928 megahertz.

22. The method of claim 14, wherein the user data is received via a low voltage power line.

23. The method of claim 14, wherein the user data is received wirelessly.

24. The method of claim 1, wherein the user data includes voice data.

25. A method of using a device coupled to a medium voltage power line, comprising:
    wirelessly receiving first utility usage data from a first device;
    wirelessly receiving second utility usage data from a second device;
    receiving first user data from a first consumer device;
    receiving second user data from a second consumer device; and transmitting the first utility usage data, the second utility usage data, the first user data, and the second user data over the medium voltage power line.

26. The method of claim 25, wherein the first utility usage data comprises power usage data.

27. The method of claim 26, wherein the second utility usage data comprises gas usage data.

28. The method of claim 25, wherein the first utility usage data comprises water usage data.

29. The method of claim 25, wherein the first utility usage data comprises gas usage data.

30. The method of claim 25, further comprising according a priority to the first user data and the second user data that is higher than that of the first utility usage data and the second utility usage data.

31. The method of claim 25, wherein the first utility usage data and the second utility usage data are different types of utility data.

32. The method of claim 25, wherein the first user data is received via a low voltage power line.

33. The method of claim 25, wherein the first user data is received wirelessly.

34. The method of claim 25, wherein the first user data includes voice data.

35. The method of claim 25, wherein the first consumer device and the second consumer device are located in different customer premises.

* * * * *

UNITED STATES PATENT AND TRADEMARK OFFICE
CERTIFICATE OF CORRECTION

PATENT NO. : 7,248,158 B2  Page 1 of 1
APPLICATION NO. : 11/327341
DATED : July 24, 2007
INVENTOR(S) : Berkman et al.

It is certified that error appears in the above-identified patent and that said Letters Patent is hereby corrected as shown below:

On the face page, in field (63), under "Related U.S. Application Data", in column 1, line 5, delete "2000," and insert -- 2001, --, therefor.

On page 3, in field (56), under "Other Publications", in column 2, line 43, delete "Eectric" and insert -- Electric --, therefor.

In column 5, line 66, delete "5.8 Ghz," and insert -- 5.8 GHz, --, therefor.

In column 8, line 52, delete "the-destination" and insert -- the destination --, therefor.

Signed and Sealed this

Twenty-third Day of October, 2007

JON W. DUDAS
*Director of the United States Patent and Trademark Office*